United States Patent [19]

Hentschel et al.

[11] Patent Number: 5,280,957
[45] Date of Patent: Jan. 25, 1994

[54] SUBFRAME FOR A MOTOR VEHICLE

[75] Inventors: Peter Hentschel; Jan Tschunko, both of Stuttgart; Rudolf Kronewitter, Böblingen; Harald Häussler, Friolzheim; Karl Sommerer, Wiernsheim; Robert Klosterhuber, Stuttgart; Friedhelm Seoffge, Leonberg-Gerbersheim, all of Fed. Rep. of Germany

[73] Assignee: Dr. Ing. h.c.F. Porsche AG, Weissach, Fed. Rep. of Germany

[21] Appl. No.: 941,812

[22] Filed: Sep. 8, 1992

[51] Int. Cl.⁵ ............................................. B62D 21/11
[52] U.S. Cl. ..................................... 280/788; 280/723
[58] Field of Search ............... 280/788, 689, 723, 717, 280/688

[56] References Cited

FOREIGN PATENT DOCUMENTS

0295661 12/1988 European Pat. Off. .
1278855 9/1968 Fed. Rep. of Germany .
3006705 10/1980 Fed. Rep. of Germany .
3048754 8/1982 Fed. Rep. of Germany .
3811259 10/1989 Fed. Rep. of Germany .
2615458 11/1988 France .

Primary Examiner—Michael S. Huppert
Assistant Examiner—Anne E. Bidwell
Attorney, Agent, or Firm—Evenson, McKeown, Edwards & Lenahan

[57] ABSTRACT

A subframe for a motor vehicle has two side plates which extend in the longitudinal direction of the vehicle, are connected with one another by cross members and have bearings for control arms of wheel suspension links, this subframe unit being connected with the vehicle body. The side plates are each formed of a torsion-proof and rigid lattice frame which extends in a vertical longitudinal plane of the vehicle. Between the side plates, torsion-proof cross members are held which can each be screwed on separately in a detachable manner. Together with the side plates, these cross members form a rigid assembly unit which comprises integrated bearings for control arms of wheel suspension links in the side plates. By way of one bearing respectively, which is arranged in spaced horizontal planes in a top and bottom chord of the side plate, the subframe unit is detachably fastened on the vehicle body.

24 Claims, 11 Drawing Sheets

SUBFRAME FOR A MOTOR VEHICLE

BACKGROUND AND SUMMARY OF THE INVENTION

The present invention relates to a subframe for a motor vehicle having two side plates which extend in the longitudinal direction of the vehicle and have bearings for control arms of wheel suspension links. The side plates each are torsion-proof and rigid lattice frames which extend in a vertical longitudinal plane of the vehicle. The side plates have integrated bearings in the side plates for control arms of wheel suspension links, and top and bottom chords. Torsion-proof cross members are each separately connectable to the side plates in a detachable manner. The cross members are held between the side plates to connect the side plates and form a rigid assembly subframe unit with the side plates.

A subframe for a front axle of a motor vehicle for the coupling of suspension links is known from the German Patent Document DE-A 12 78 855, in which side plates are connected with cross members, and a fixedly connected structural unit is formed. The use of such a subframe is contemplated for one vehicle type only and cannot be used for vehicle types of different constructions and driving conceptions.

It is an object of the present invention to provide a subframe which, with respect to the construction, can be adapted in a simple manner to differently constructed vehicle types as well as driving and operating systems and ensures an economical assembly during manufacturing as well as for repair purposes.

This and other objects are achieved by the present invention which provides a subframe for a motor vehicle having two side plates which extend in the longitudinal direction of the vehicle and having bearings for control arms of wheel suspension links. The side plates each are torsion-proof and rigid lattice frames which extend in a vertical longitudinal plane of the vehicle. The side plates have integrated bearings in the side plates for control arms of wheel suspension links, and top and bottom chords. Torsion-proof cross members are each separately connectable to the side plates in a detachable manner. The cross members are held between the side plates to connect the side plates and form a rigid assembly subframe unit with the side plates. The assembly subframe unit is detachably fastened on a body of the vehicle via one bearing respectively in the top and bottom chords of the side plate. The bearings are arranged in spaced horizontal planes.

Advantageously, the subframe comprises detachably assembled structural elements, such as side plates and cross members. In comparison to undetachably connected elements according to the state of the art, this makes it possible for the subframe to be used in vehicles of different conceptions in that only the cross members are exchanged and in that the subframe can be adapted to the local situations of the vehicle body or of the drive unit or to a vehicle with rear wheel steering. For this purpose, the side plates are provided with corresponding fastening capability for cross members that can connected locally in various manners.

Together with the cross members, the side plates of the subframe form a rigid assembly unit. They have integrated bearing receiving devices for the wheel suspension. Together with the connected wheel suspension links, these side plates form a so-called preassembly unit which, after the connection with the cross members, is a final assembly unit which, for example, in series production on the assembly line, can be connected with the vehicle body. With this type of assembly, it is also advantageous that the corresponding adjustments of the axle can be carried out before the mounting into the vehicle.

In a preferred embodiment, the side plates are made from cast aluminum in a light-weight construction and each have connecting upright struts between a bottom chord and a top chord, an opening forming between these struts and the chords which, in the case of driven rear wheels, is used for the guiding-through of a drive shaft and which is situated centrically with respect to the wheel spin axis.

On the forward free end of the bottom chord and at the rearward free end of the top chord, bearings for the fixing on the vehicle body can be inserted. These are provided approximately at the same longitudinal distance to the wheel spin axis so that the same transversal or lateral forces are introduced into the subframe bearings. On the connecting line of the two bearings, the wheel spin axis is also situated which has the advantage of a low introduction of moments into the subframe.

The bearings have a defined elastic characteristic in the longitudinal, transverse and vertical direction.

The cross members of the subframe are designed corresponding to the vehicle type, for example, with a rearward drive assembly or with a forward drive assembly and a rearward differential gear, the side plates being usable for each of these vehicle types in an unchanged state. The linking of the cross members takes place in junction points of the side plates. As a function of the vehicle with a rearward drive assembly or the vehicle with the forward drive assembly and the rear axle differential gear, the cross member will then be constructed correspondingly either as a bridge member or as a cross member with a center bearing for the differential gear which is preferably situated in a neutral zone where the slightest movements occur. The differential gear is supported on the subframe only in this one bearing. The additional bearing may be provided directly on the vehicle body or on a support of the vehicle with a relatively large base so that only moderate forces are introduced into the subframe in the vertical direction and mainly no overturning moment is introduced into the subframe, as would be the case if the two bearings for the holding of the rear axle differential gear according to the state of the art were arranged on the subframe.

Also, for a vehicle with additional rear wheel steering and independently of the position of the drive assembly, a different rearward cross member is used than for a vehicle having only front wheel steering. With additional rear wheel steering, a cross member is used in which a corresponding operating cylinder for the steering is arranged, or the operating cylinder is integrated into the cross member, in which case, the operating cylinder will then be connected on each end with an oblong console which is screwed to the side plate. Without any deflection, the tie rod applied to the wheel carrier is guided through the console and is connected with the piston rod by way of a joint. The cross member has a partially cornered cross section and is designed corresponding to the loads to be absorbed.

In certain preferred embodiments, the consoles are constructed to be non-resistant to bending and twisting which permits the predominant keeping-away of forces acting on the operating cylinders. For achieving a compact construction of the cross member unit comprising the integrated operating cylinder with the rear wheel control element, the latter is connected directly with the housing of the operating cylinder or with the cross member, either in front or behind the cross member as viewed in the driving direction.

As described above, the cross members are constructed to be adapted to the respective vehicle type. Thus, it is necessary, in the case of a rear drive unit that a relatively large space is created in the vertical direction that is free from the cross member. This is advantageously achieved by a bridge member which spans the drive unit and which, by means of its downwardly directed legs, is fastened to the side plate by screws which extend in the longitudinal direction of the vehicle. A compensating of tolerances will become possible as a result.

For the economical manufacturing of the bridge member, the bridge member comprises two identical parts which are connected with one another in an articulated manner in the center in the area of the transversely extending supporting webs by a pin. The bridge member has a light-weight construction and, for this purpose, has webs which connect the upper and the lower chord, are arranged in the manner of a lattice construction and form openings between one another.

The cross members either have a round cross section or comprise a ribbed casting in the form of a U-profile or a double-T-profile, or have a polygonal construction and are made of a light metal or another light material. The linking to the side plates takes place by connecting flanges on the ends of the cross members. These are welded on or are connected with the cross member in another manner. The construction of the subframe as an assembly unit comprising detachable side plates and cross members has the advantage of an exchangeability of all parts in the case of repair. Furthermore, in a simple manner, a power unit or assembly may be demounted by the removal of a lower cross member, in which case the wheel suspension remains unchanged so that there will be no suspension alignment.

Other objects, advantages and novel features of the present invention will become apparent from the following detailed description of the invention when considered in conjunction with the accompanying drawings.

DETAILED DESCRIPTION OF THE DRAWINGS

A subframe 1 for a motor vehicle comprises two side plates 2 and 3 of an identical construction as well as cross members 4, 5 and 6 (FIG. 1) which connect the side plates with one another for a first vehicle type with a forward drive assembly and a rear axle differential gear. The subframe 1 has cross members 7, 8 and 9 (FIG. 2) for a vehicle type with a rearward drive assembly comprising the engine, the transmission and the rear axle differential gear. Each vehicle type may have rear wheel steering which requires a special rear cross member 50 (FIG. 12) instead of the cross member 5 and 8.

Figure 1:
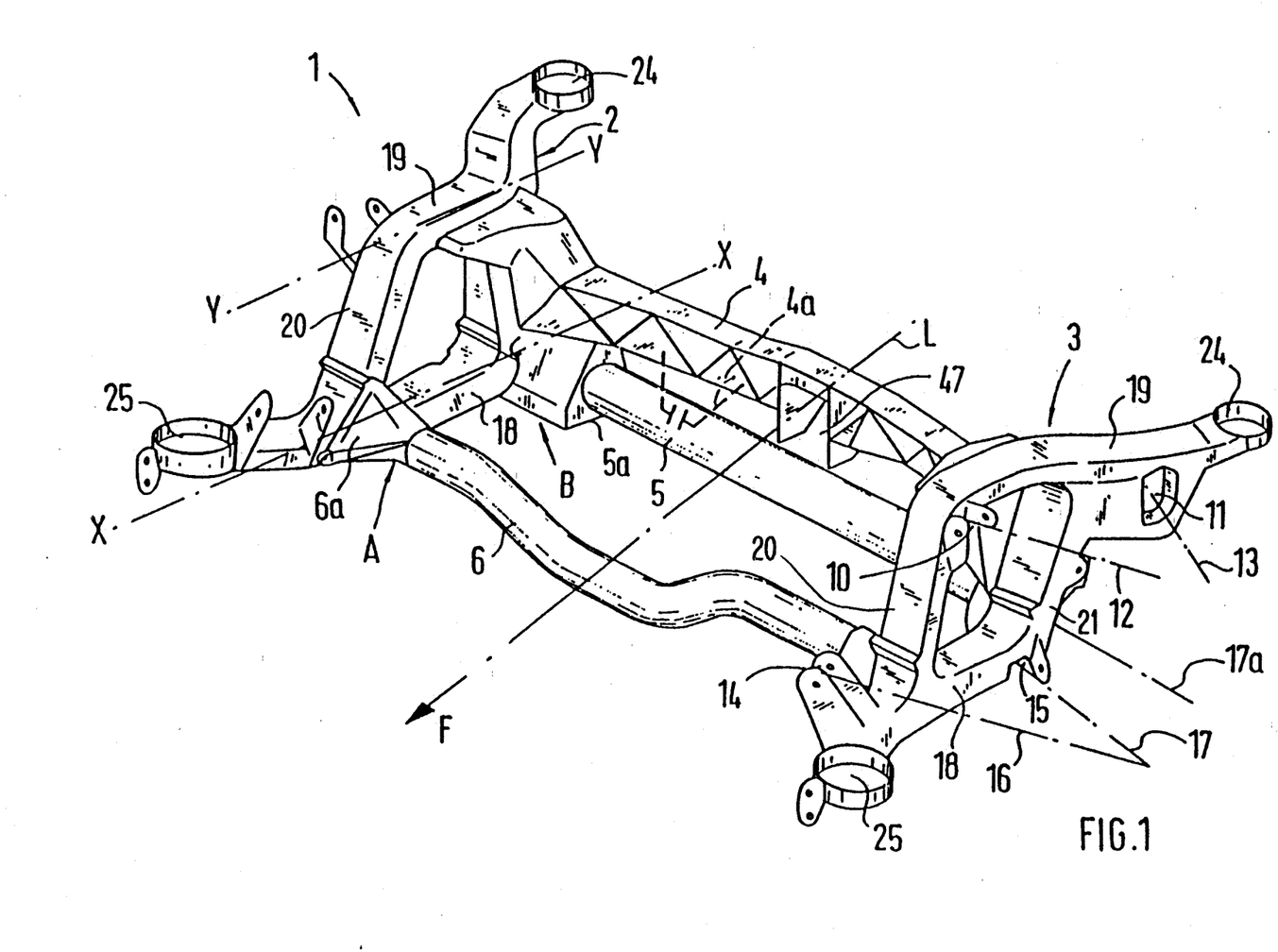
FIG. 1 is a diagrammatic representation of a subframe constructed in accordance with an embodiment of the present invention for a vehicle with a rear axle differential gear.
Figure 2:
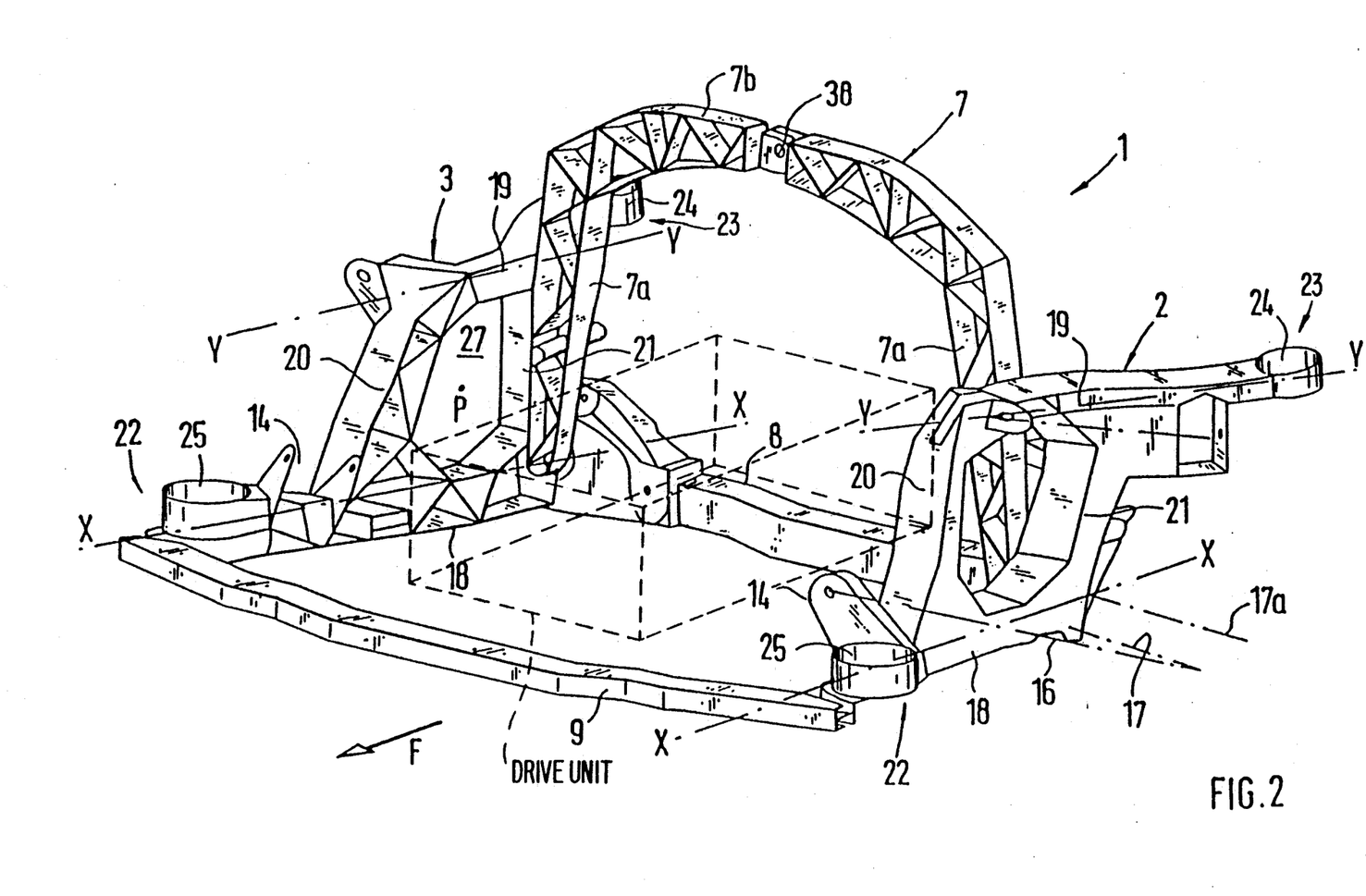
FIGS. 2 and 3 are diagrammatic representations of a subframe constructed in accordance with an embodiment of the present invention for a vehicle with a rearward drive unit.
Figure 3:
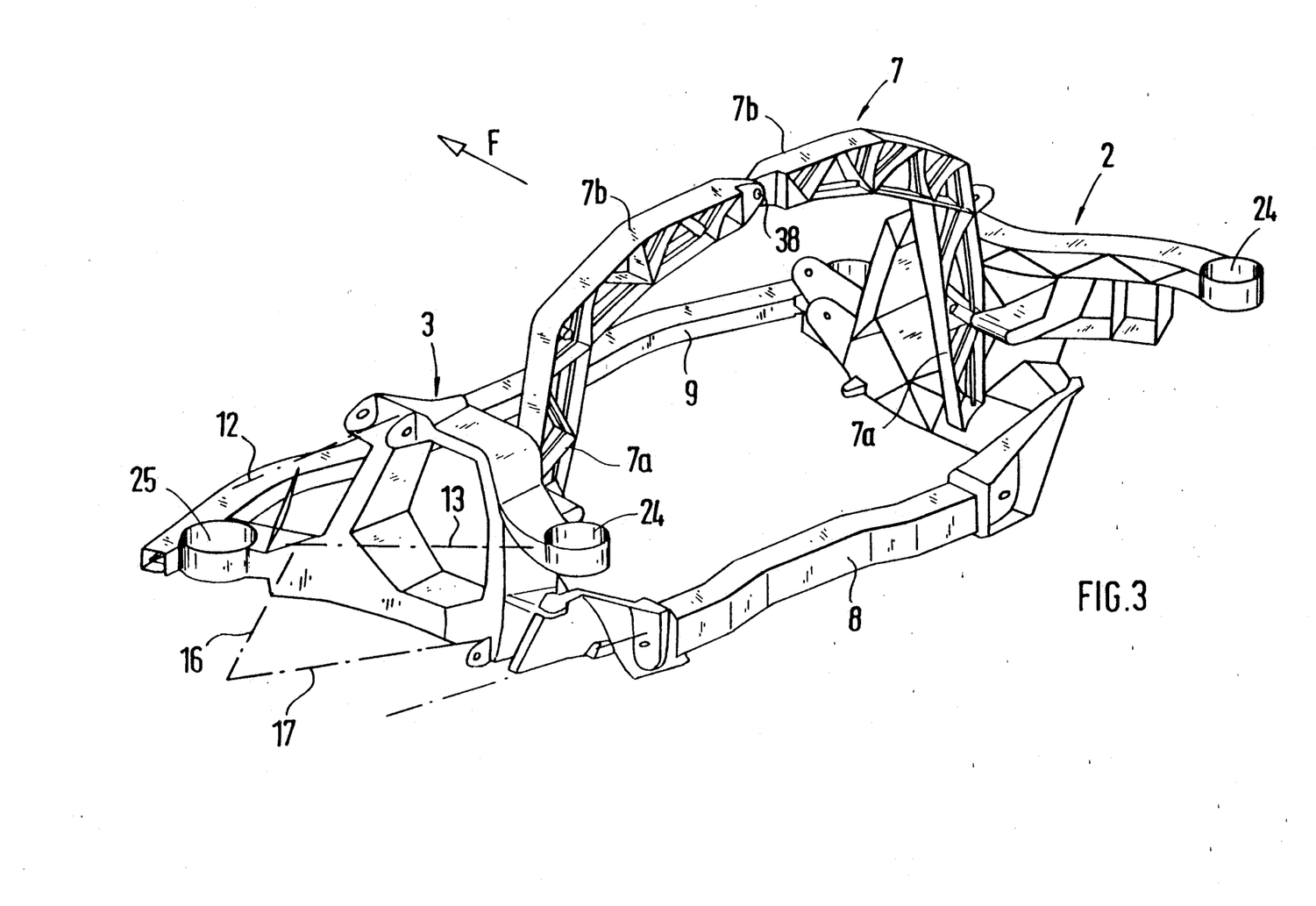

The side plate 2 and 3 comprises a lattice-type frame, which is resistant to twisting and bending, having, for example, a ribbing on one side which extends on each wheel side in a vertical longitudinal plane. The ribbing on the side plate is constructed such that the profile is open only in the direction of the vehicle center so that dirt occurring on the wheel will not adhere to the ribs. Between the side plates 2 and 3, the cross members 4, 5 and 6 or 7, 8 and 9 are arranged and are screwed together with the side plates 2 and 3. In the side plates 2 and 3, bearings 10 and 11 are provided for control arms 12, 13 arranged in an upper plane Y-Y as well as bearings 14, 15 for control arms 16, 17 arranged in a lower plane X-X (FIG. 1). Furthermore, in the plane of the control arms 16 and 17, a tie rod 17a is arranged which is supported on the cross member 5 and 8. For an arrangement of a rear wheel steering system, the tie rod 17a is connected with a piston rod of an operating cylinder. A drive unit, schematically illustrated by dashed lines in FIG. 2, is arranged, on the one side, between the side plates 2, 3 and, on the other side, between the the cross members 8, 9 arranged in the lower horizontal plane X-X and the spanning bridge member 7.

Figure 4:
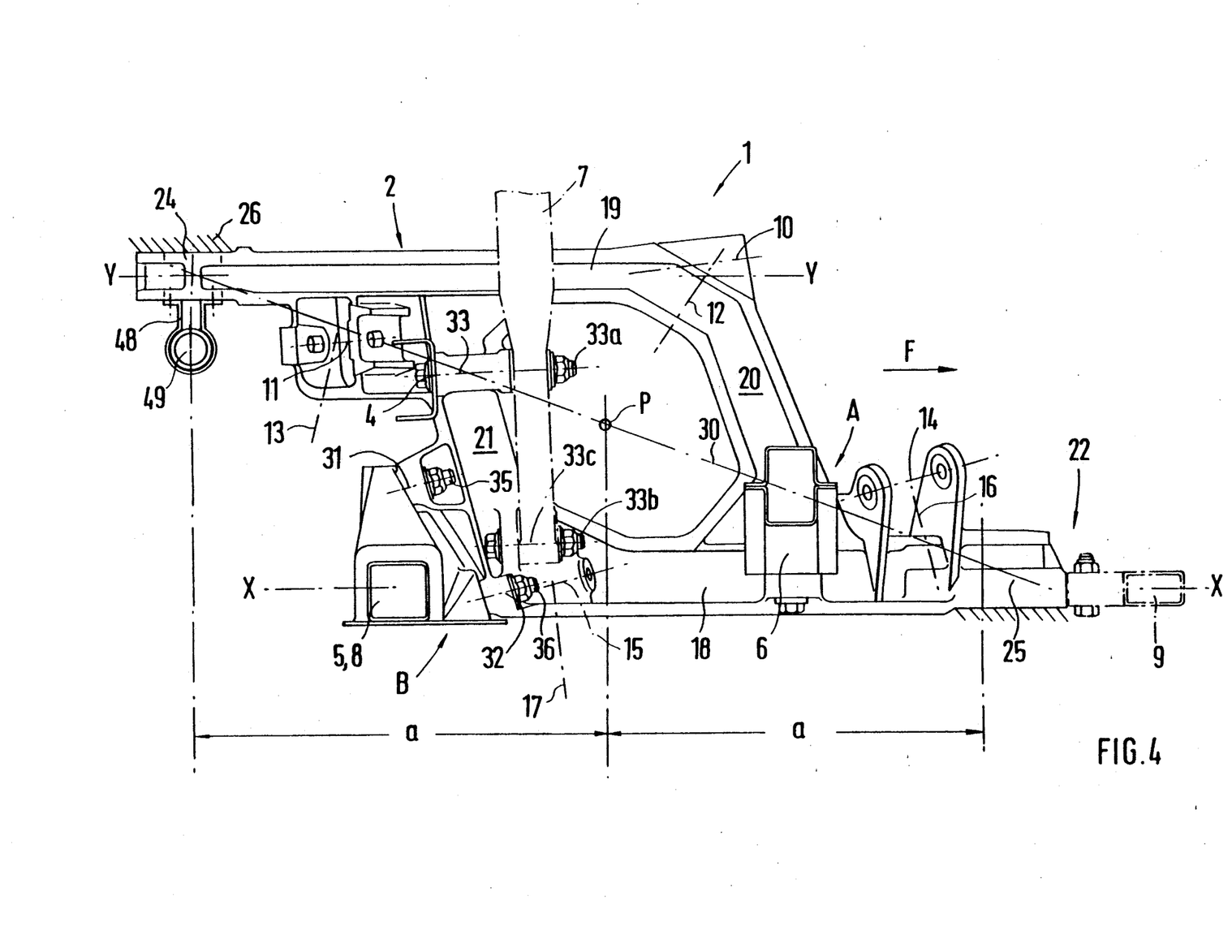
FIG. 4 is a schematic representation of a side plate of the subframe with the connections of the cross members according to the vehicle types of FIGS. 1 and 2.
Figure 5:
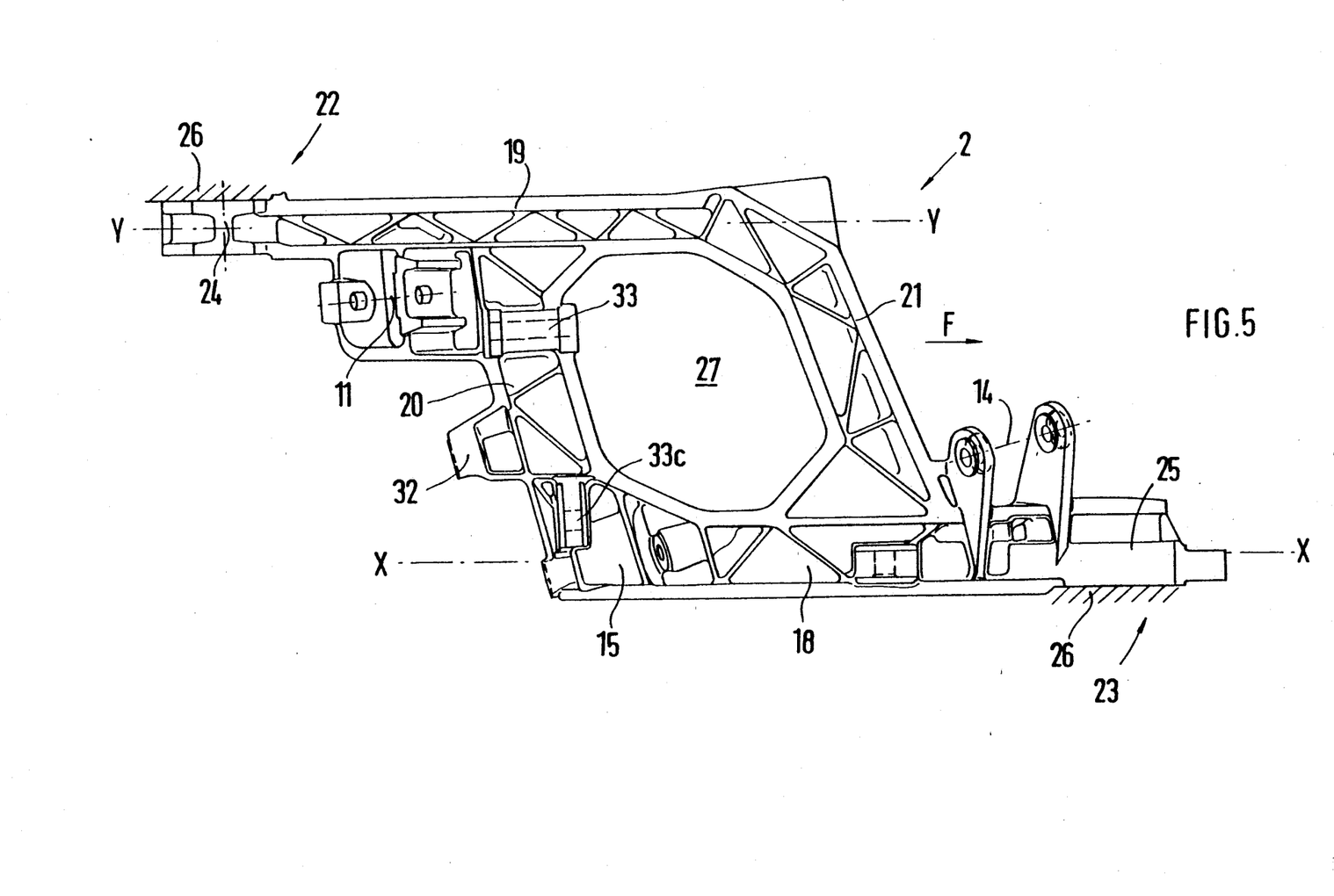
FIG. 5 and 5a are views of a constructively designed side plate of the subframe, FIG. 5 being a view of the side plate from the inside, and FIG. 5a being a view of the side plate from the outside.
Figure 5A:
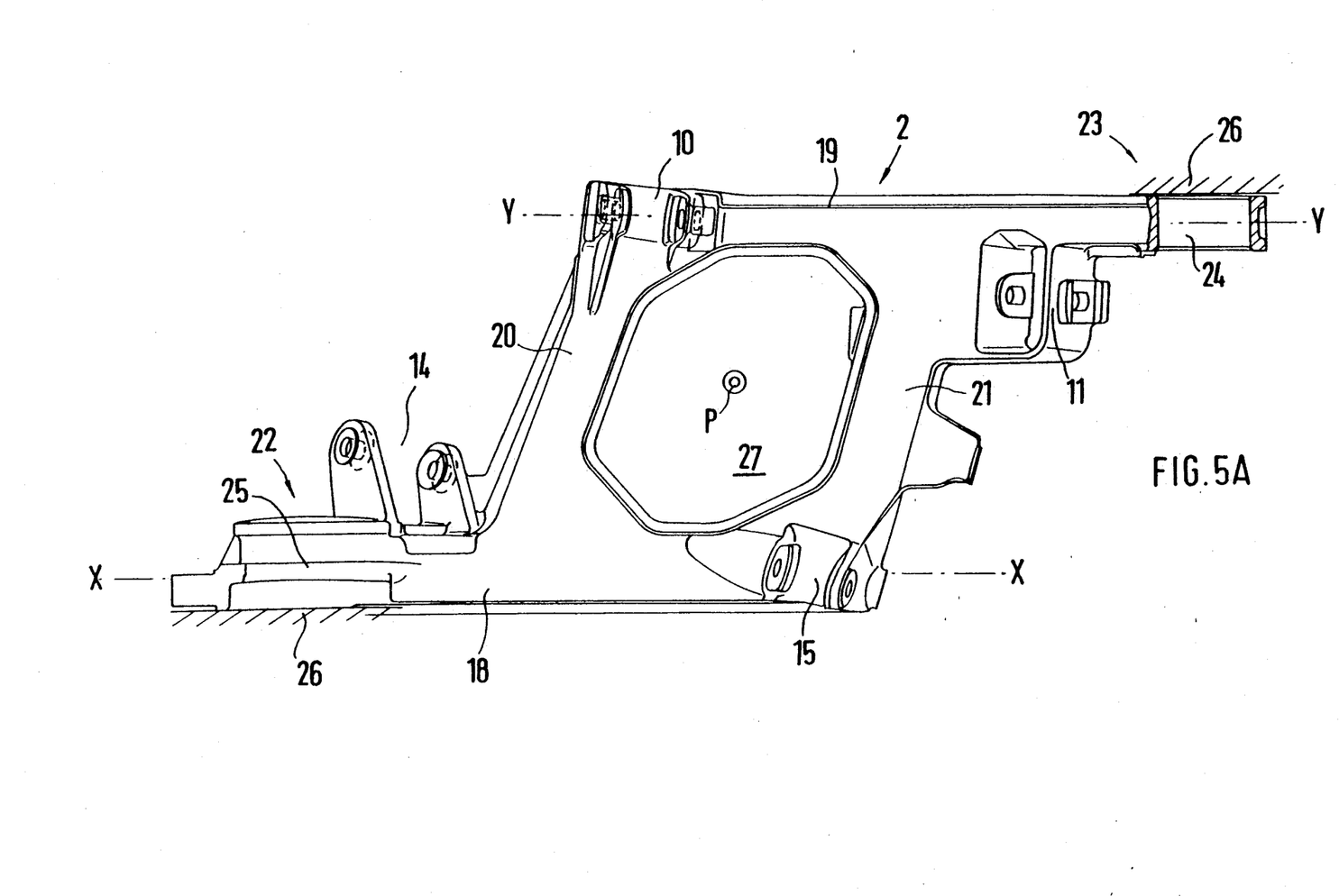
Figure 6:
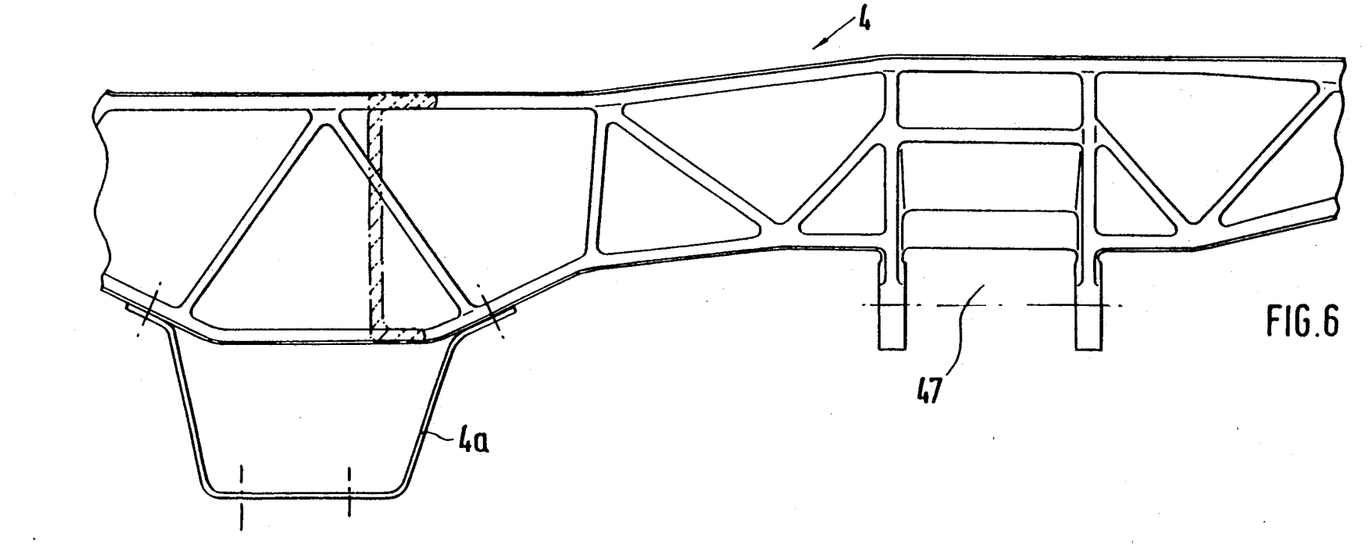
FIG. 6 is an interior upper cross member for the construction according to the vehicle type of FIG. 1.

The side plates 2, 3 are preferably constructed as castings and, in a first lower horizontal plane X-X, each have a bottom chord 18 and, at a distance to it, in a second upper horizontal plane Y-Y, have a top chord 19. Via spaced upright struts 20 and 21, with an opening 27 formed therebetween, these chords 18 and 19 are connected with one another to form a stable unit. On the free ends 22 and 23 of the chords 19 and 18, bearings 24 and 25 respectively are provided for the connection with the vehicle body 26 which are not shown in detail. Suspension gears 48 for stabilizer 49 are fastened to the side plates (FIG. 4).

To prevent an influencing of the wheel suspension via the bearings in the side plates 2, 3, these side plates 2, 3 are designed in a defined manner. Thus, the subframe 1 is connected with the vehicle body 26 by upright elastic bearings. In the vertical and longitudinal direction of the vehicle, these bearings have a softer characteristic than in the transverse direction of the vehicle. Preferably, these bearing of the subframe for the fastening to the vehicle body are arranged at an identical longitudinal distance a to the wheel spin axis (FIG. 4) or to a center point P of the opening 27 in the side plates. On the inside, the respective cross member 5 and 8 has the operating cylinder 40 (FIGS. 11-13) which is surrounded by a support part which is dimensioned correspondingly to the load and has a partially cornered shape. A rear wheel control element 45 is connected with the support part of the operating cylinder 40 and forms a compact structural unit with the cross member 8. The rear wheel control element 45 may comprise a valve connected with the housing of the operating cylinder 40.

The opening 27 formed between the struts 20 and 21 and the chords 18 and 19 of the side plates 2 and 3 has an approximate center point P which coincides with the wheel spin axis or through which, in the case of a rear wheel drive, a drive shaft is guided which is not shown in the figures.

For assembly, the side plates 2 and 3 are connected with the lower control arms 16, 17 and the upper control arms 12, 13 and form a preassembly unit. This unit is connected with the cross members 4, 5, 6 or 7, 8, 9 and is combined with the vehicle body 26 as the final assembly unit by way of the supporting bearings 24, 25. The subframe unit can be fastened on the vehicle body 26 in an exact position while retaining the wheel adjustment values in an unchanged manner.

The assembly may also be carried out in a different manner than connecting the side plates 2, 3 with the cross members and then establishing a connection with the wheel suspension. The assembling method will correspond to the respective most favorable conditions of assembly line production.

The bearings 24 and 25 in the side plate 2, 3 for the supporting bearings to the vehicle body 26 are arranged on a connecting line 30 which extends through the center point P of the opening 27 or through the wheel spin axis (FIG. 4). Directly adjacent to this connecting line 30, the receiving device 11 for an upper rear control arm 13 is provided on the one side and, on the other side, the receiving device 14 for a lower forward control arm 16 is provided.

The cross members 4, 5 and 6 or 7, 8 and 9 are held in junction points of the side plates 2 and 3 via screws with respective identical fastening bores 31, 32 in the side plates 2 and 3 being used for the cross members 5 and 8. In contrast, for the cross members 4 and 7, only one fastening bore 33 jointly is used, the cross member 7 having another bore 33c, as indicated in detail in FIG. 4. In this FIG. 4, the cross members 4, 5, 6, 7, 8 and 9 for the two vehicle types according to FIG. 1 and 2 are shown jointly.

Figure 7:
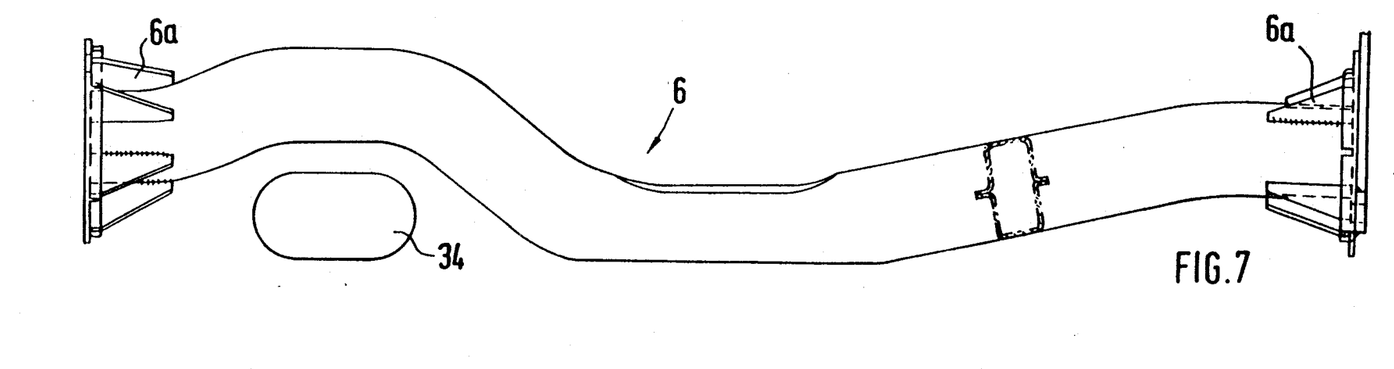
FIG. 7 is a forward lower cross member for the construction according to the vehicle type of FIG. 1.

As described above, the cross members 4, 5 and 6 are used in the lower horizontal plane X-X for the first vehicle type according to FIG. 1 with the rear axle differential gear. Thus, in the lower horizontal plane X-X in the coinciding area A of the bottom chord 18 with the upright strut 20, the forward cross member 6 (FIG. 7) is arranged which has one connecting flange 6a respectively on the end face, this connecting flange 6a being connected with the side plate 2 and 3 by way of screws. This cross member 6 may be constructed either of two shells or of a pipe. The shape of the support in the transverse direction of the vehicle is designed correspondingly to the shape of the rear axle differential and of exhaust pipes 34.

Figure 8:
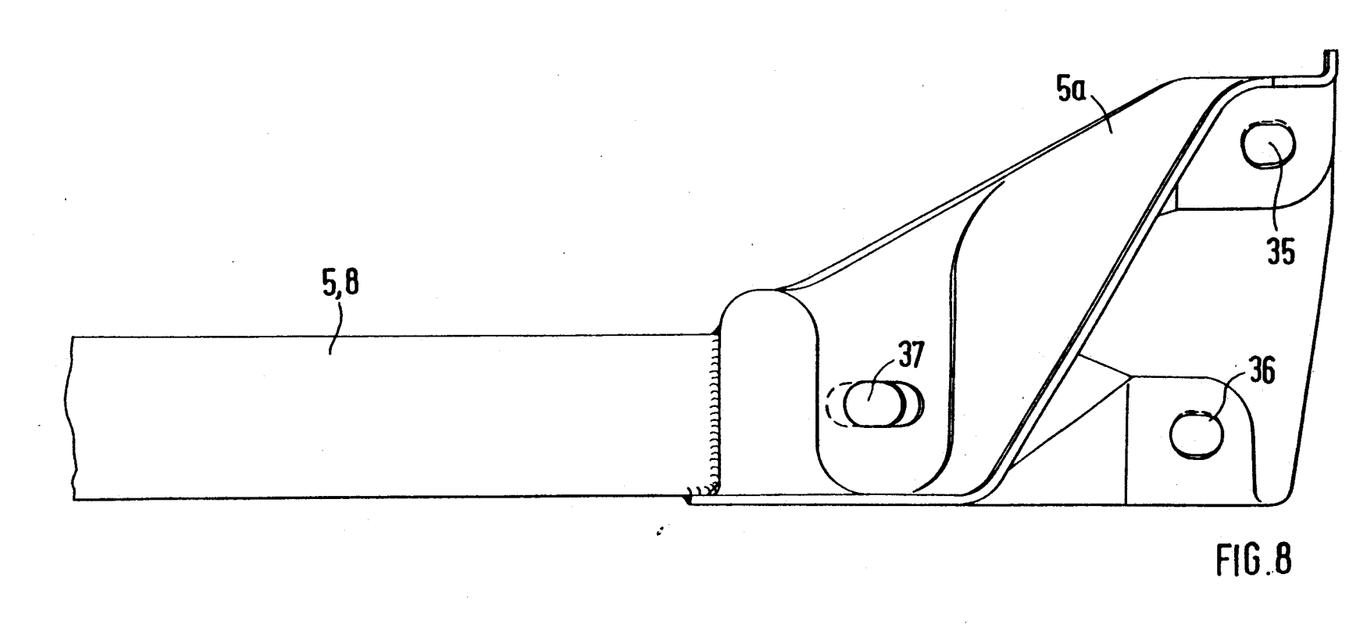
FIG. 8 is a rear lower cross member for the construction according to the vehicle type of FIGS. 1 and 2.
Figure 9:
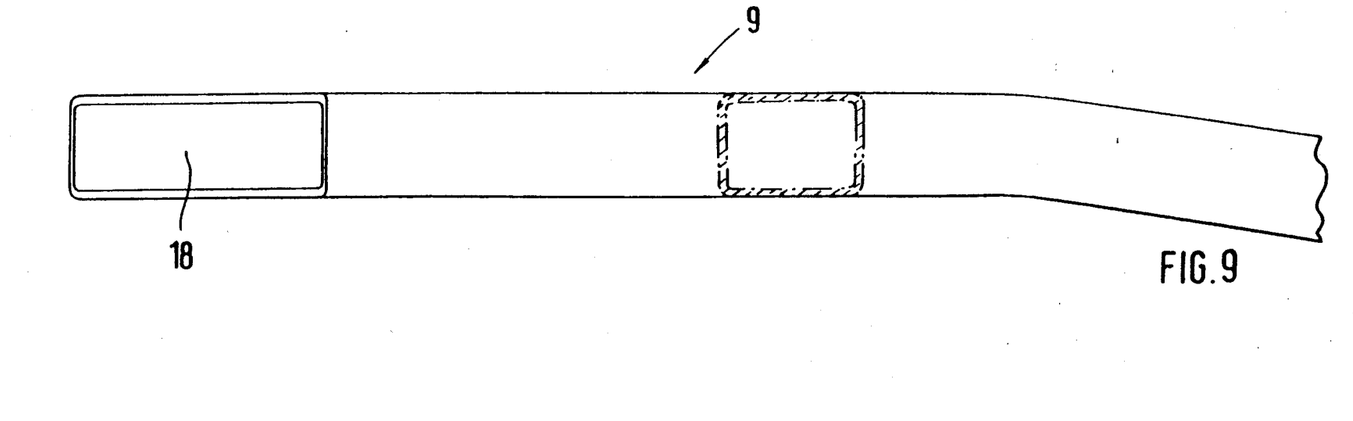
FIG. 9 is a forward lower cross member for the embodiment according to the vehicle type of FIG. 2.
Figure 10:
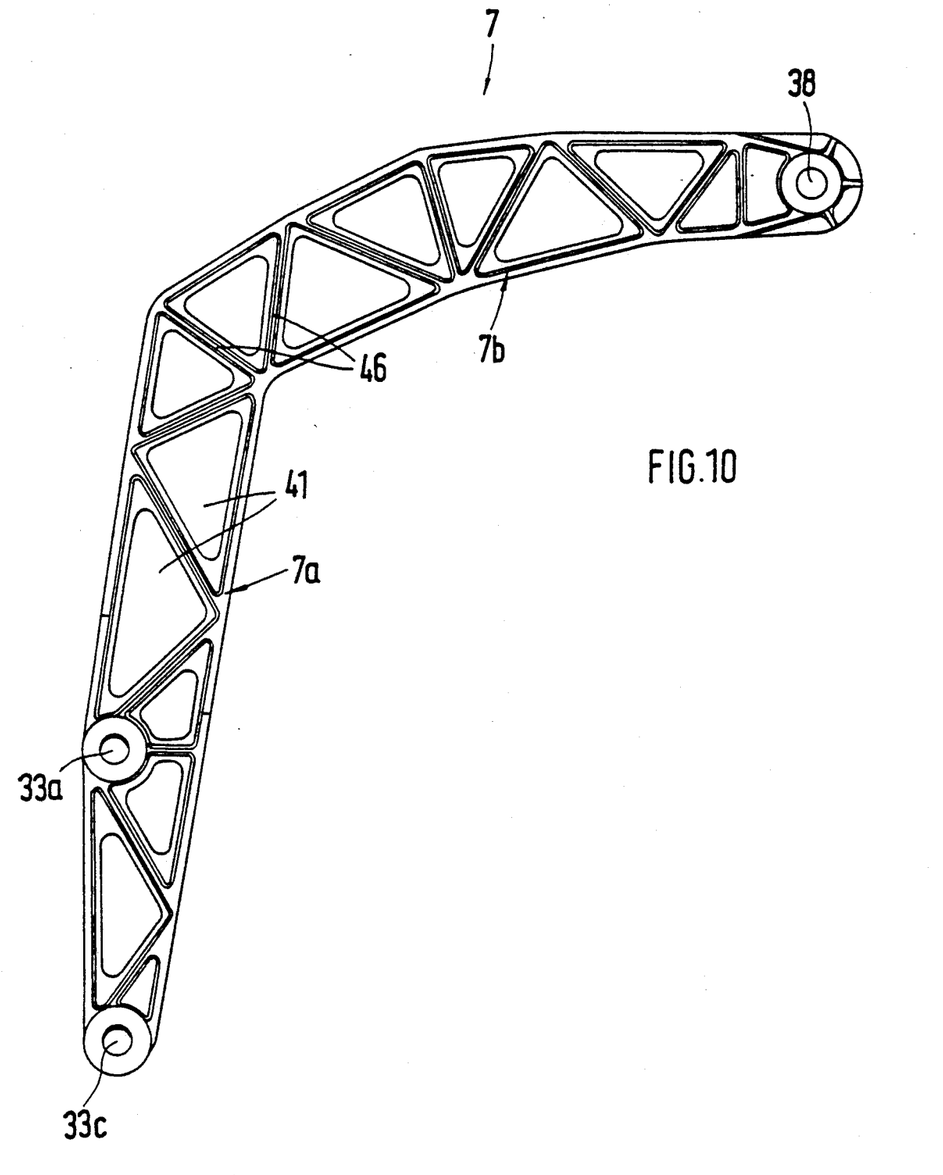
FIG. 10 is a enlarged representation of one half of a bridge member for the vehicle type of FIG. 2.

The additional rearward cross member 5, 8 in the plane X-X is arranged in the coinciding area B of the bottom chord 18 with the strut 21 and is fastened via end-face connecting flanges 5a by means of screws 35 and 36 (FIG. 8) on the side plate 2, 3. Thus, the side plates 2, 3 have respective locally offset junction points for several cross members 5, 6 and 8 to be detachably mounted. The connecting flange 5a and the cross member 5 and 8 may be constructed in one piece. In the case of a vehicle with rear wheel steering according to FIGS. 11 and 12, this cross member 5 and 8 may be an operating cylinder 40 which will be explained in detail in the following.

Above the cross member 5 and 8, another cross member 4 or 7 is arranged between the side plates 2 and 3. For the fastening of the support 4 by way of screws, bores are arranged in projections of the side plates 2 and 3 which extend in the longitudinal direction of the vehicle. By way of a screw 33a inserted into an upper bore 33, cross member 4 is fastened on one side of the bore 33. In the embodiment of FIG. 2, cross member 7 is fastened on the other side of bore 33 and is additionally held by means of another pin 33b in the bore 33c in the side plate 2, 3 (See FIG. 4).

The cross member 4 is preferably constructed as a U-profile in a cast or sheet metal construction and has a bearing receiving device 47 arranged in the longitudinal center axis of the vehicle which supports a rear axle differential gear by means of an inserted bearing. The cross member 4 may be connected by supports 4a on both sides of the bearing receiving device 47 with the member 5 disposed underneath.

The additional cross member 7 (FIG. 2) is constructed as a curved bridge member which has vertically extending legs 7a which are followed by supporting webs 7b extending transversely above the plane Y-Y of the side plates 2, 3. Preferably, the bridge member 7 comprises two constructionally identical parts 7a and 7b, the transversely extending supporting web 7b of each bridge member 7 being connected by a pin 38 which extends in the longitudinal direction of the vehicle. This pin 38 has only a connecting function without any influence on the stability. The bridge member 7 comprises a lattice element with ribs 46 between which openings 41 are formed.

According to the embodiment of FIG. 2, the cross member 9, which has a rectangular cross section and has receiving devices on its free ends for a fitting onto the side plates 2, 3, is connected with the free ends 22 of the bottom chord 18 of the side plates 2 and 3, and a connection takes place by way of pins.

The cross member 5 and 8 may be connected with an operating cylinder 40 for a rear wheel steering system which is not shown in detail. The piston rod 44 of the operating cylinder 40 will then be connected with the tie rod 17a which is articulated to the wheel carrier of the vehicle.

Figure 11:
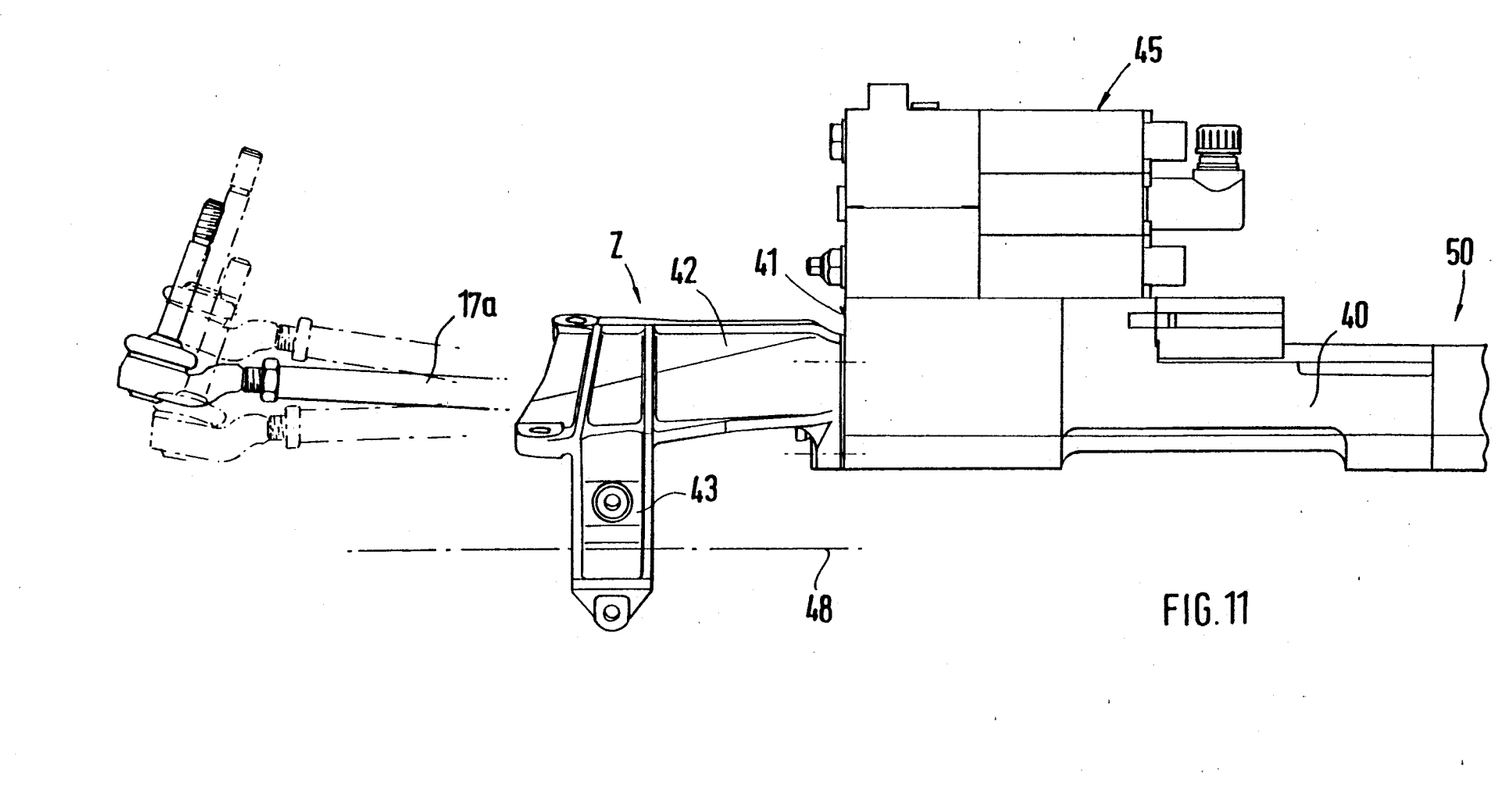
FIG. 11 is a top view of a rear lower cross member consisting of an operating cylinder.
Figure 12:
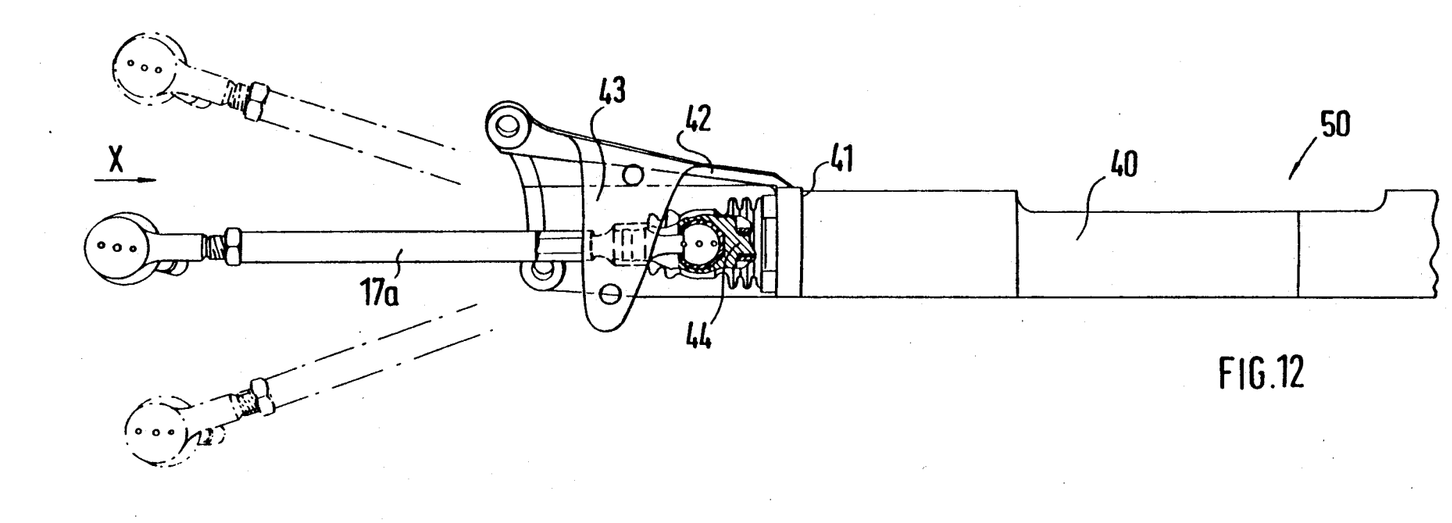
FIG. 12 is a frontal view of a detail Z of the oblong console between the side plate and the operating cylinder.
Figure 13:
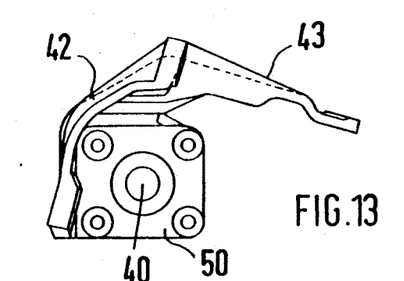
FIG. 13 is a view of a stabilizer bearing in the direction X of FIG. 12.

According to the embodiment of FIGS. 11 and 12, the operating cylinder 40 is constructed as a cross member 50 which will then replace the cross members 5 and 8. One longitudinal console 42 respectively is fastened to the free front faces 41 of the cylinder housing and is detachably connected with the side plates 2 and 3 by way of screws. This console comprises an open profile which is soft with respect to torsion and bending and which has an approximately angular construction in the transverse direction. A bearing 43 of a stabilizer 48 may selectively be connected with the console 42. The console 42 can be made of a non-rigid non-torsion-proof profile on which an integrated bearing 43 is provided for the stabilizer 48.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A subframe for a motor vehicle comprising:
   two side plates which extend in the longitudinal direction of the vehicle and having bearings for control arms of wheel suspension links, the side plates each being a torsion-proof and rigid lattice frame which extends in a vertical longitudinal plane of the vehicle, and which have integrated bearings in the side plates for control arms of wheel suspension links, and top and bottom chords;
   torsion-proof cross members which are each separately connectable to the side plates in a detachable manner, the cross members being held between the side plates to connect the side plates and form a rigid assembly subframe unit with the side plates;
   wherein the assembly subframe unit is detachably fastened on a body of the vehicle via one bearing respectively in the top and bottom chords of the side plate, the bearings being arranged in spaced horizontal planes.

2. A subframe according to claim 1, wherein the side plates, together with the control arms of the wheel suspension link, form a preassembly unit which, connected with the cross members, forms a final assembly subframe unit which can be fastened on the vehicle body in an exact position while retaining the wheel adjustment values in a unchanged manner.

3. A subframe according to claim 1, wherein the bearings of the subframe on the side plates comprise vertically upright elastic bearings which have a softer characteristic in longitudinal and vertical directions of the vehicle than in a transverse direction of the vehicle.

4. A subframe according to claim 3, wherein the bearings of the subframe unit, for the fastening on the vehicle body, are arranged on each side plate, at approximately the same longitudinal distance from a wheel spin axis.

5. A subframe according to claim 1, wherein the side plates are castings and each comprises the bottom chord extending in a first lower horizontal plane and the top chord extending in the second horizontal plane, spaced upright struts that connect the bottom chord and the top chord, with the respective bearings for the fastening on the vehicle body being arranged at the free end of the bottom chord and at the free end of the top.

6. A subframe according to claim 5, wherein between the struts and the chords of the side plates, an opening is formed which is arranged in an area of a guided-through drive shaft of a rear wheel drive.

7. A subframe according to claim 5, wherein the chords and the struts of the side plates comprise walls connected by ribs, and at least one of hollow spaces and breakthroughs are provided between the respective ribs.

8. A subframe according to claim 7, wherein the ribs on the side plates are arranged in such a manner that they are directed towards a longitudinal center plane of the vehicle, the outer surfaces of the side plates being closed.

9. A subframe according to claim 1, wherein the bearings in the side plates as well as a spin axis of the wheel held by control arms of the wheel suspension are situated on a common connecting line.

10. A subframe according to claim 9, wherein the bearings for a lower control arm, which is in front with respect to a driving direction, and an upper control arm, which is in the rear with respect to the driving direction, are arranged in the side plate proximate to the connecting line.

11. A subframe according to claim 1, wherein the side plates have respective locally offset junction points for several cross members to be detachably mounted, and wherein the assembly subframe unit includes three of said cross members, the two side plates, the suspension links and a tie rod.

12. A subframe according to claim 1, wherein in the lower horizontal plane in a coinciding area of the bottom chord with the two upright struts of the side plates, respective junction points are formed in which, relative to the driving direction, via connecting flanges, one rearward and one forward cross member respectively can be fastened by screws, and a third cross member is held by connecting flanges above the rear cross member on the upright struts.

13. A subframe according to claim 12, wherein the third cross member comprises a bearing receiving device, which is arranged in a longitudinal center axis of the vehicle, for a rear wheel differential gear, the rear wheel differential gear having, relative to the driving direction, only a rearward support and is disposed via a forward support on at least one of a cross member and on the vehicle body.

14. A subframe according to claim 12, wherein the additional cross member is a curved bridge member and comprises vertically extending legs with connecting transversely extending supporting struts, the legs being connectable with the side plates by screws.

15. A subframe according to claim 14, wherein the legs of the bridge member are fastened to the side plates by screws arranged in a longitudinal direction of the vehicle.

16. A subframe according to claim 14, wherein the bridge member comprises two parts consisting of identical components, and wherein the two transversely extending supporting webs of the bridge member are connected with one another.

17. A subframe according to claim 16, wherein the two supporting webs are connected by a hinge pin which is arranged in the longitudinal direction of the vehicle and permits a relative movement.

18. A subframe according to claim 14, wherein a drive unit is arranged, on the one side, between the side plates, and, on the other side, between the cross members arranged in a lower horizontal plane and the spanning bridge member.

19. A subframe according to claim 12, characterized in that the cross member, which is situated in front relative to the driving direction, is fastened to the free ends of the bottom chords of the side plates by end-face connecting flanges.

20. A subframe according to claim 1, wherein one of the cross members is fastened on the side plate by at least one screw aligned in the longitudinal direction of the vehicle.

21. A subframe according to claim 1, wherein the cross member which relative to the driving direction is arranged in the lower horizontal plane, receives an operating cylinder for a rear wheel steering system whose piston rod is connected with the tie rod in an articulated manner.

22. A subframe for a motor vehicle with rear wheel steering system and two side plates extending in a longitudinal direction of the vehicle, the side plates being connected with one another by cross members and having bearings for control arms of wheel suspension links, this subframe unit being connected with the vehicle body, wherein a rearward, with respect to the driving direction, lower cross member comprises an operating cylinder, having free ends to which one oblong console respectively is fastened, the oblong console being detachably connected by screws with the side plates and through which a piston rod of the operating cylinder is guided and is connected with a tie rod.

23. A subframe according to claim 22, wherein the console is made of a non-rigid non-torsion-proof profile on which an integrated bearing is provided for a stabilizer.

24. A subframe according to claim 22, wherein a rear wheel control element comprising a valve is connected with the housing of the operating cylinder.

* * * * *

UNITED STATES PATENT AND TRADEMARK OFFICE
CERTIFICATE OF CORRECTION

PATENT NO. : 5,280,957

DATED : January 25, 1994

INVENTOR(S) : Hentschel et al.

It is certified that error appears in the above-identified patent and that said Letters Patent is hereby corrected as shown below:

TITLE PAGE

Please enter the Foreign Application Priority Data as follows:

—Sept. 5, 1991 (DE)  Fed. Rep. of Germany ....... 4129538.2—.

Signed and Sealed this

Twenty-first Day of June, 1994

*Attest:*

BRUCE LEHMAN

*Attesting Officer*   *Commissioner of Patents and Trademarks*